(12) United States Patent
Rivera et al.

(10) Patent No.: US 11,449,393 B2
(45) Date of Patent: Sep. 20, 2022

(54) AUTOMATIC RESTORE FOR A FAILED VIRTUAL COMPUTING SESSION

(71) Applicant: CITRIX SYSTEMS, INC., Fort Lauderdale, FL (US)

(72) Inventors: Juan C. Rivera, Fort Lauderdale, FL (US); Christopher W. Midgley, Marlborough, MA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 489 days.

(21) Appl. No.: 16/532,733

(22) Filed: Aug. 6, 2019

(65) Prior Publication Data

US 2021/0042197 A1    Feb. 11, 2021

(51) Int. Cl.
*G06F 11/14* (2006.01)
*G06F 9/455* (2018.01)

(52) U.S. Cl.
CPC ...... *G06F 11/1464* (2013.01); *G06F 9/45558* (2013.01); *G06F 11/1484* (2013.01); *G06F 2009/45595* (2013.01); *G06F 2201/815* (2013.01)

(58) Field of Classification Search
CPC ............. G06F 11/1464; G06F 9/45558; G06F 11/1484; G06F 2009/45595; G06F 2201/815; G06F 11/1658; G06F 11/2038; G06F 11/2097; G06F 11/301; G06F 2009/4557; G06F 2009/45575; G06F 2201/86; G06F 9/452
USPC ........................................................ 714/4.11
See application file for complete search history.

(56) References Cited

U.S. PATENT DOCUMENTS

| | | | |
|---|---|---|---|
| 8,230,256 B1 * | 7/2012 | Raut | G06F 11/2028 714/13 |
| 2014/0149354 A1 * | 5/2014 | Chan | G06F 9/455 707/639 |
| 2014/0149695 A1 | 5/2014 | Zaslavsky et al. | |
| 2015/0019704 A1 | 1/2015 | Suryanarayanan et al. | |
| 2015/0341383 A1 * | 11/2015 | Reddy | H04L 63/0876 726/22 |
| 2017/0083354 A1 | 3/2017 | Thomas et al. | |
| 2018/0095845 A1 | 4/2018 | Sanakkayala et al. | |
| 2020/0125386 A1 * | 4/2020 | Busick | G06F 16/1774 |

* cited by examiner

*Primary Examiner* — Yair Leibovich
(74) *Attorney, Agent, or Firm* — Allen, Dyer, Doppelt + Gilchrist, PA (57) ABSTRACT

A computer system includes a client device, and a server configured to monitor a status of a virtual computing session for failure, with the virtual computing session being accessed by the client device. The server redirects the client device to a backup virtual computing session based on failure of the virtual computing session, and updates a state of the backup virtual computing session to match a previous state of the virtual computing session prior to failure.

17 Claims, 9 Drawing Sheets

AUTOMATIC RESTORE FOR A FAILED VIRTUAL COMPUTING SESSION

TECHNICAL FIELD

The present disclosure relates to cloud service providers, and more particularly, to providing backup virtual desktops to users.

BACKGROUND

There are several different types of desktop virtualization systems. As an example, Virtual Desktop Infrastructure (VDI) refers to the process of running a user desktop inside a virtual machine that resides on a server, with the virtual machine providing a virtual computing session. Servers in such systems may include storage for virtual desktop images and system configuration information, as well as software components to provide the virtual desktops and allow users to interconnect to them. For example, a VDI server may include one or more hypervisors (i.e., virtual machine managers) to create and maintain multiple virtual machines, software to manage the hypervisors, a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

SUMMARY

A computer system comprises a client device, and a server configured to monitor a virtual computing session for failure, with the virtual computing session being accessed by the client device. The client device is redirected to a backup virtual computing session based on failure of the virtual computing session, and a state of the backup virtual computing session is updated to match a previous state of the virtual computing session prior to failure.

Failure of the virtual computing session corresponds to when the virtual computing session becomes unavailable while in use by the client device. This may be due to a virtual server providing the computing session being taken offline for maintenance without any warning, or due to failure of the virtual server. Loss of productivity is minimized by redirecting the client device to a backup virtual computing session that corresponds to a most recent state update on applications running in the assigned virtual computing session.

The computer system may further include at least one virtual delivery appliance connecting the client device to the virtual computing session, with the server being further configured to receive state updates on the virtual computing session from the at least one virtual delivery appliance. The server may update the state of the backup virtual computing session with a most recent state update received.

The server may update the state of the backup virtual computing session before failure of the virtual computing session. Alternatively, the server may update the state of the backup virtual computing session after failure of the virtual computing session.

The at least one virtual delivery appliance may comprise a plurality of virtual delivery appliances, and the server may redirect the client device to a different virtual delivery appliance to access the backup virtual computing session.

The virtual computing session may be hosted in a data center, and the backup virtual computing session may be hosted in a different data center. The at least one virtual delivery appliance may monitor a status of the virtual computing session, and provide the status to the server.

Another aspect is directed to a server comprising a memory and a processor cooperating with the memory and configured to monitor a virtual computing session for failure, with the virtual computing session being accessed by a client device. The client device is redirected to a backup virtual computing session based on failure of the virtual computing session, and a state of the backup virtual computing session is updated to match a previous state of the virtual computing session prior to failure.

Yet another aspect is directed to a method comprising monitoring a virtual computing session for failure, with the virtual computing session being accessed by a client device. The client device is redirected to a backup virtual computing session based on failure of the virtual computing session, and a state of the backup virtual computing session is updated to match a previous state of the virtual computing session prior to failure.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be discussed below, organizations or enterprises turn to cloud service providers to provide desktop virtualization systems for their users. Since these organizations do not manage maintenance of the virtual servers, there is typically a service level agreement (SLA) between the cloud service providers and the organizations to ensure a minimum level of service is maintained.

Each cloud service provider typically manages tens of thousands of virtual servers to provide the virtual desktops. Even with a SLA of 99.9999%, there is still a possibility of a considerable number of virtual desktops being shut down due to maintenance of a virtual server without any warning to the users. Consequently, user productivity is significantly impacted when their virtual computing session is no longer available. Thus, existing technologies provide an overall user experience that is inconsistent and frustrating at times which can lead to less user adaption of such services.

To solve the problems with existing virtualization technologies described above, the present disclosure describes systems, devices and methods in which a state of the applications running on each virtual desktop is periodically saved. This allows each user with a virtual computing session that is no longer available to be redirected to a backup virtual computing session configured with a most recent state update received prior to the virtual computing session becoming unavailable.

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
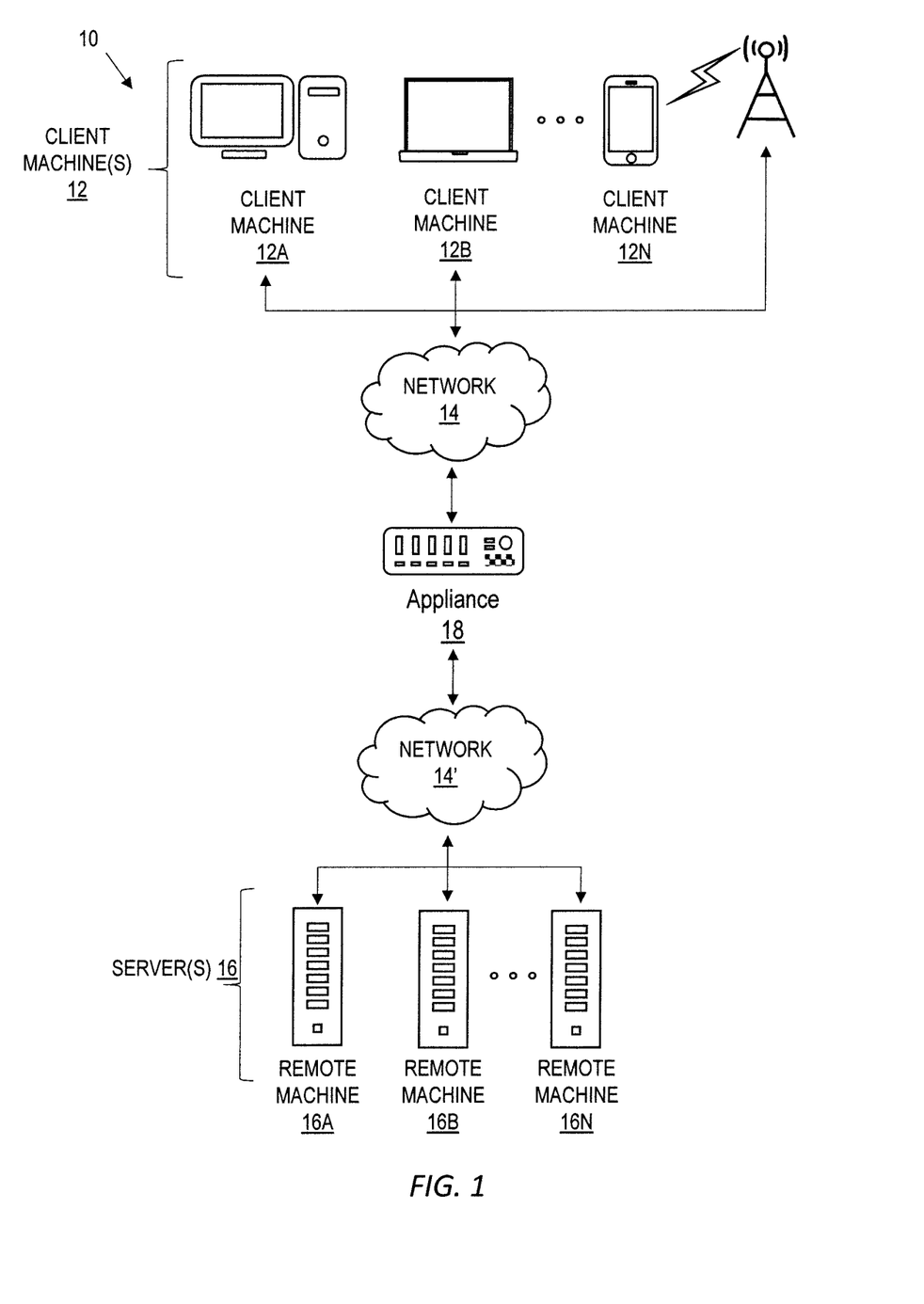
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
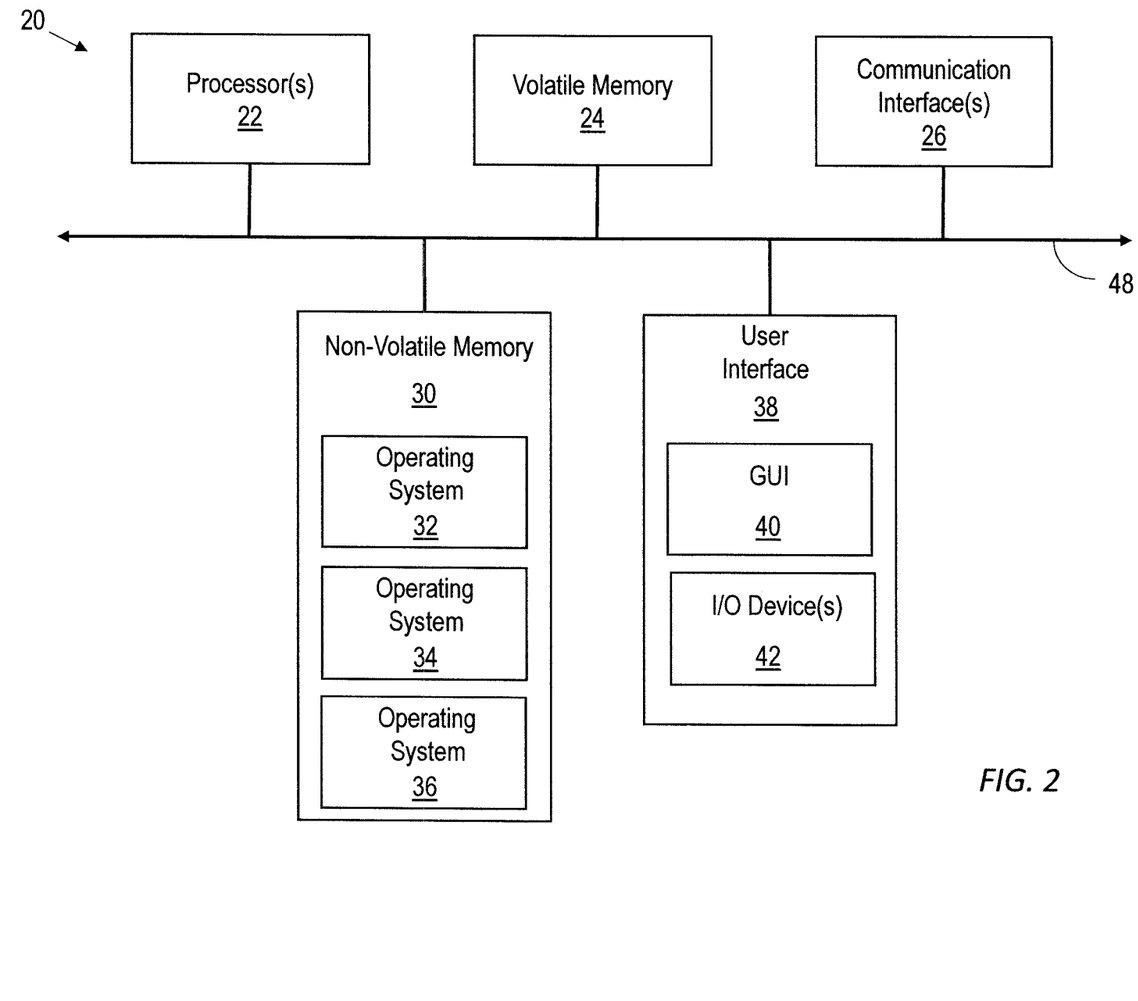
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
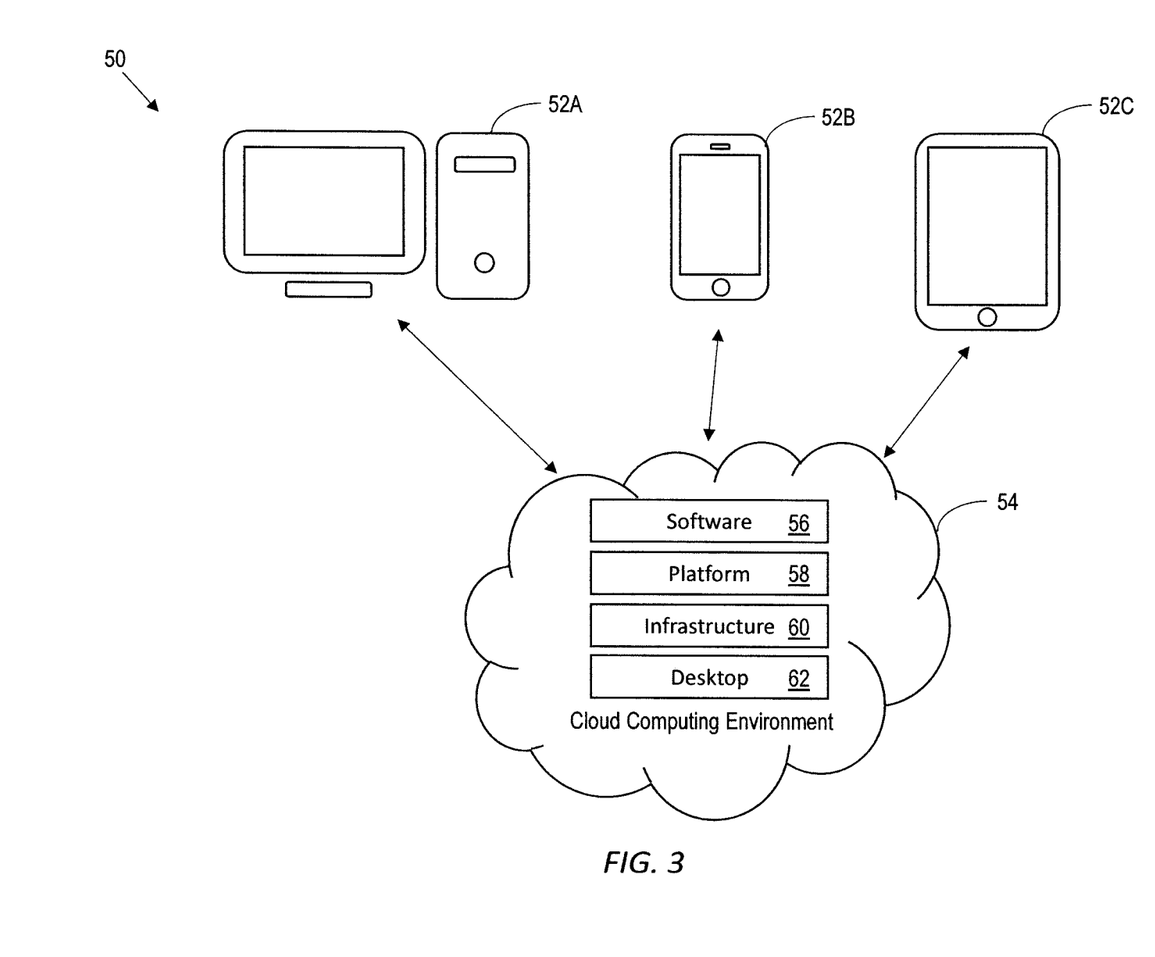
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. CITRIX CLOUD is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
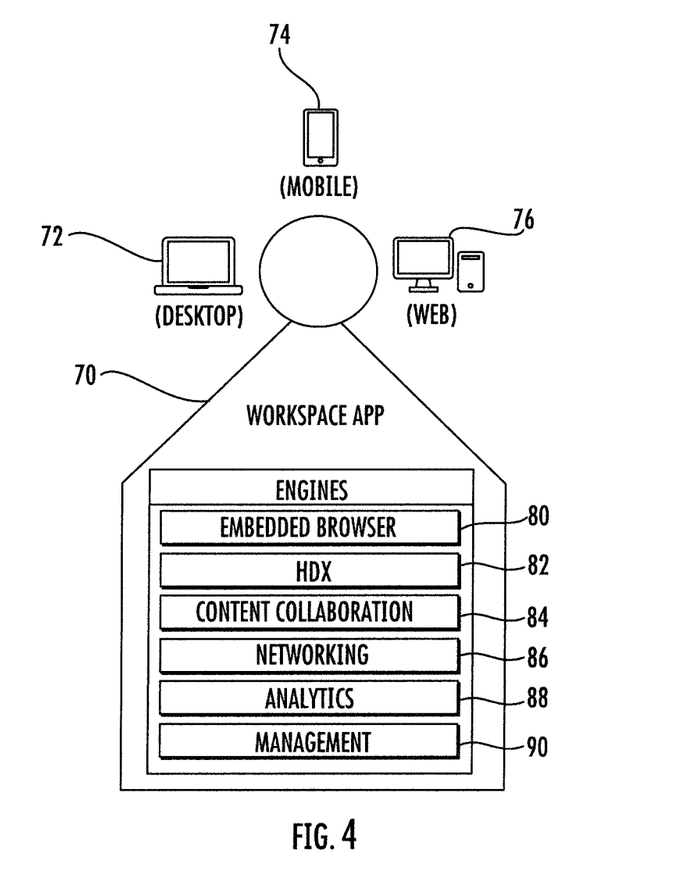
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide users access to their workspace environment. The web version of the workspace app 70 is used when a user does not want to install the workspace app or does not have the rights to install the workspace app, such as when operating a public kiosk Each of these different versions of the workspace app 70 may provide the same user experience. This allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Engines 80-90 optimize the user experience for a particular resource, and also provide an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression techniques. Such techniques can be optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current in terms of performance and policies. This not only provides users with the latest capabilities, but also includes extra security enhancements. The workspace app 70 includes an auto-update service that routinely checks and automatically deploys updates based on customizable policies.

Figure 5:
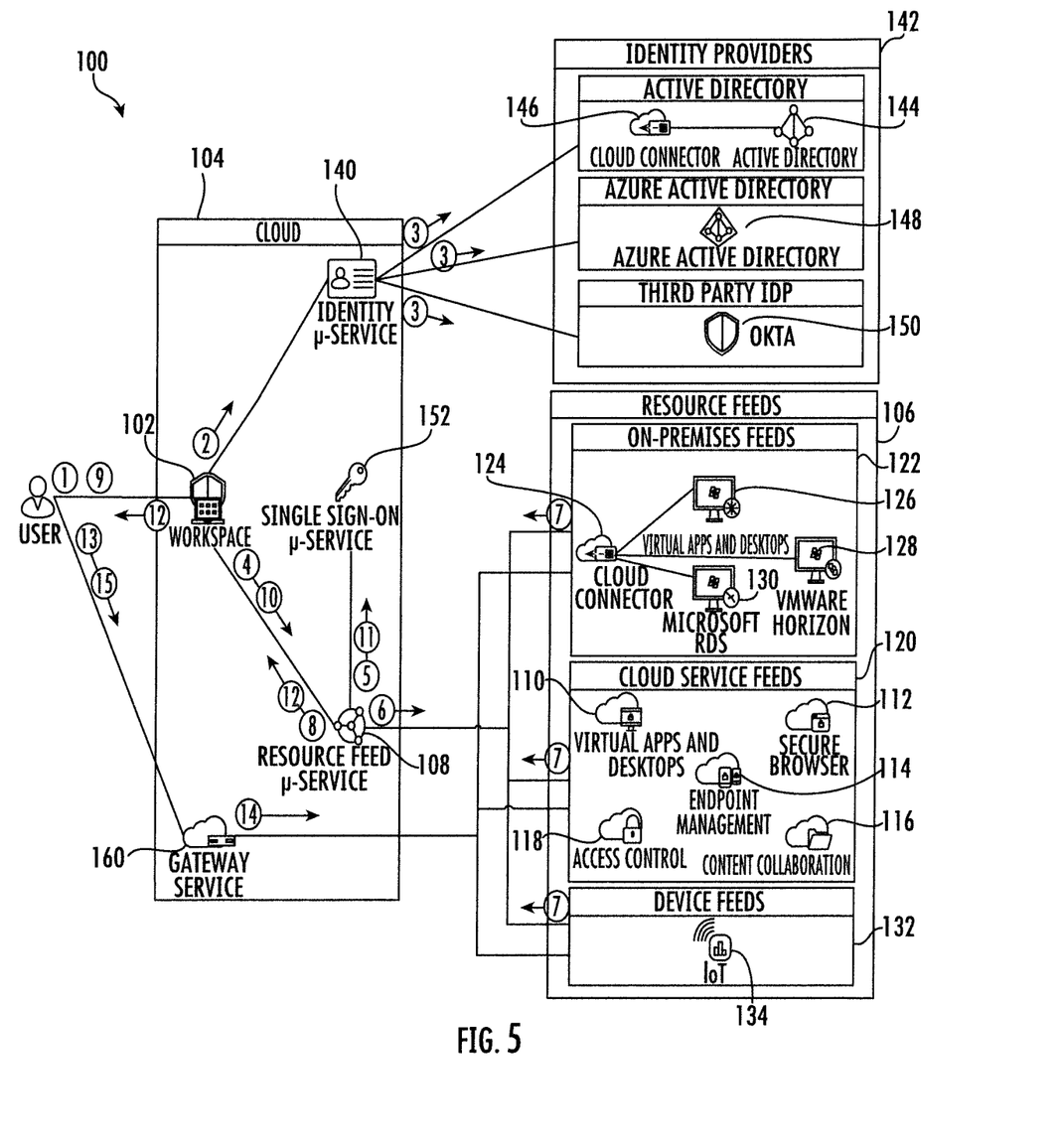
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds 16 via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, VMware Horizon 128 or Microsoft RDS 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The workspace experience service 102 is a component of the Citrix Cloud 104 that enumerates and delivers workspace resources to the Citrix workspace user experience. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource via the gateway service 160 (event 15). Having an entire workspace delivered through a single access point or application advantageously improves productivity and streamlines common workflows for the user.

Figure 6:
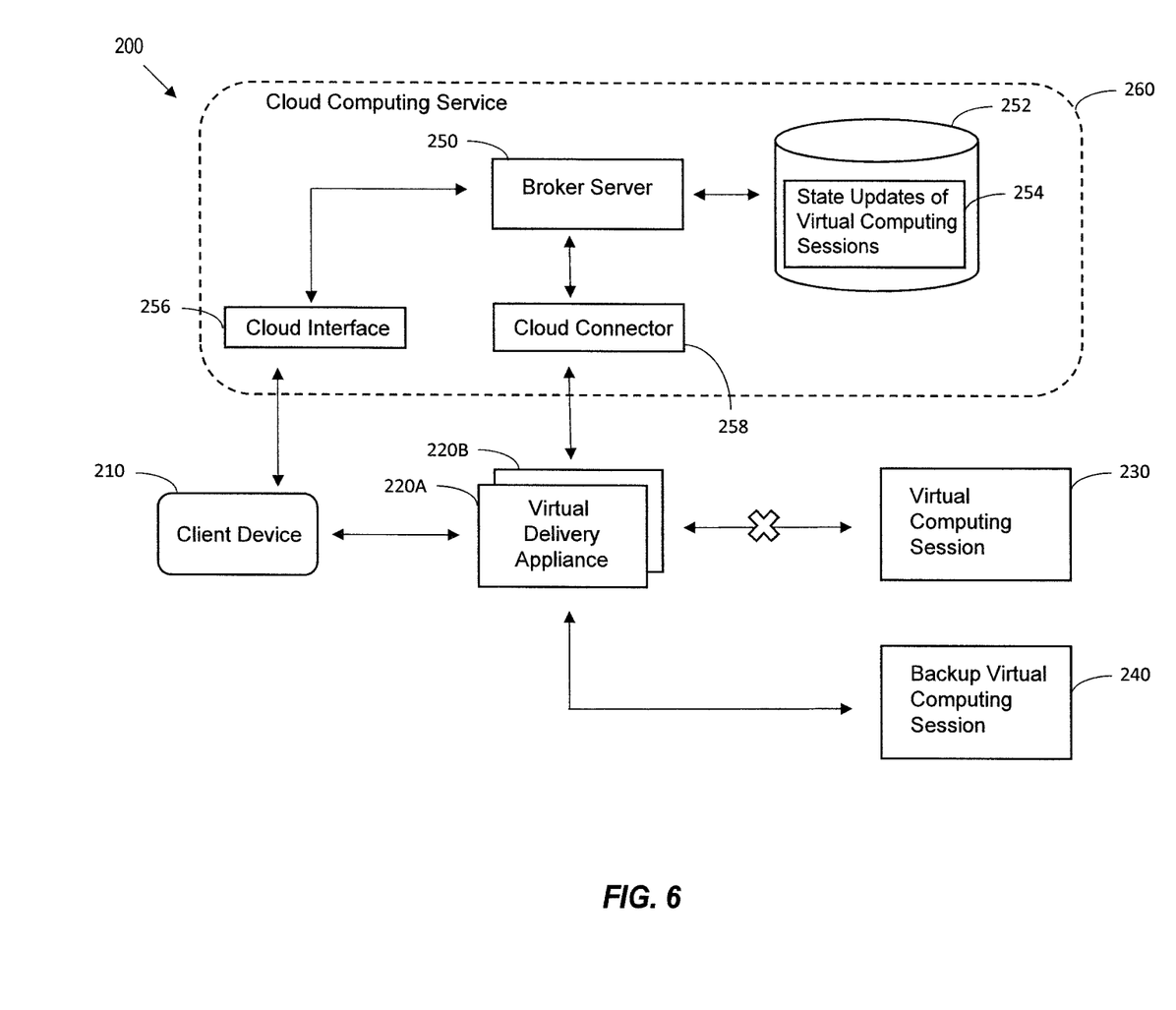
FIG. 6 is a schematic block diagram of a computer system providing backup virtual computing sessions in which various aspects of the disclosure may be implemented.

Referring now to FIG. 6, the illustrated computer system 200 advantageously redirects a client device 210 from a virtual computing session 230 to another virtual computing session 240 based on failure of the virtual computing session 230. The other virtual computing session 240 will also be referred to as a backup virtual computing session 240. The client device 210 may be a smartphone, a tablet computer, a laptop computer, a desktop computer, for example.

Failure of the virtual computing session 230 corresponds to when the virtual computing session 230 becomes unavailable while in use by the client device 210. A user is no longer able to view a virtual app or virtual desktop when the virtual computing session 230 fails. This may be due to a virtual server providing the virtual computing sessions 230 being taken offline for maintenance without any warning, or due to failure of the virtual server. Loss of productivity is minimized by redirecting the client device 210 to a backup virtual computing session 240 that corresponds to a recent or previous state update on applications running in the assigned virtual computing session 230. The updates are at particular points in time, with the most recent update being the last update prior to the client device 210 being redirected to the backup virtual computing session 240. Redirecting the client device 210 to the backup virtual computing session 240 may take a few seconds. Without the redirection, it would take several minutes or more for a user to access another virtual computing session, during which time the user is unable to work.

At least one virtual delivery appliance 220A is configured to connect the client device 210 to the virtual computing session 230. A virtual delivery appliance 220A is software installed on a virtual machine running in a host computing device (i.e., virtual server). The virtual machine provides the virtual computing session 230, and the virtual delivery appliance 220A makes the virtual computing session 230 remotely available to a client device 210. The at least one virtual delivery appliance 220A may be a Citrix Virtual Delivery Agent (VDA), for example.

A broker service 250 is configured to interface with the at least one virtual delivery appliance 220A. The broker service 250 may also be referred to as a broker server or server. The broker service 250 monitors the virtual computing session 230 for failure, redirects the client device 210 to the backup virtual computing session 240 based on a failure of the virtual computing session 230, and updates a state of the backup virtual computing session 240 to match a previous state of the virtual computing session 230 prior to failure.

While only one client device 210, one virtual computing session 230, and one backup virtual computing session 240 are shown in the illustrated example, it will be appreciated that the computer system 200 may include a plurality of client devices 210, a plurality of virtual computing sessions 230 and a plurality of backup virtual computing sessions 240. Even though only two virtual delivery appliances 220A, 220B are shown, additional virtual delivery appliances are provided as necessary based on how many client devices 210 are requesting virtual computing sessions 230.

One example architecture for providing access to virtual computing sessions 230 is Citrix Virtual Apps and Desktops (CVAD) provided by Citrix Systems, Inc. Citrix Virtual Apps is an application virtualization platform that helps optimize productivity with universal access to virtual apps and server-based desktops from different client devices 210. CVAD carries all the same functionality as Citrix Virtual Apps, plus the option to implement a scalable Virtual Desktop Infrastructure (VDI). Citrix Virtual Apps/CVAD are available as a cloud service or an on-prem configuration.

Such computer virtualization infrastructures may utilize Independent Computing Architecture (ICA) files for authenticating client devices 210 to access respective virtual computing sessions 230 and computing resources. ICA is a protocol designed for transmitting Windows graphical display data as well as keyboard and mouse input over a network. ICA files contain short-lived Secure Ticket Authority (STA) and logon tickets. The STA ticket may be used to authorize a connection to a virtual delivery appliance 220A (e.g., Citrix Virtual Delivery Agent (VDA)) via a Gateway (e.g., Citrix Gateway).

The logon ticket may single-sign-on (SSOn) a user of the client device 210 into the virtual computing session 230. In the case of CVAD, this is done through a "high-definition" experience (HDX) session, which may be available to users of centralized applications and desktops, on different client devices and over different networks.

In the illustrated example, functions of the broker service 250 are performed within a cloud computing service 260 (e.g., Citrix Cloud). The broker service 250 includes a processor and memory to determines which desktops and applications a user is allowed to access, as well as determining which virtual delivery appliance 220A is to host the specific applications or desktop.

Additional functions of the broker service 250 include monitoring a status of the virtual computing session 230. The status is provided by the virtual delivery appliance 220A to the broker service 250. In addition, the broker service 250 also periodically receives state updates 254 on applications running in the assigned virtual computing session 230. The state updates 254 are stored in a database 252 within the cloud computing service 260. When the virtual computing session 230 is no longer available (i.e., referred to as a failure), the broker service 250 redirects the client device 210 to the backup virtual computing session 240 and updates a state of the backup virtual computing session 240 with a most recent state update 254 received prior to the virtual computing session 230 becoming unavailable.

The cloud computing service 260 illustratively includes a cloud interface 256. The cloud interface 256 is configured to interface with the client device 210 for enrollment of the client device 210 in the cloud computing service 260. In an example implementation, the cloud interface 256 may be implemented with Citrix Workspace, and the client device 210 may be running Citrix Workspace App, although other suitable platforms may be used in different embodiments.

The at least one virtual delivery appliance 220A may communicate with the broker service 250 via a cloud connector 258. In an example embodiment, the cloud connector 258 may be implemented with Citrix Cloud Connector, although other suitable platforms may also be used in different embodiments. Citrix Cloud Connector is a component that serves as a channel for communication between Citrix Cloud and customer resource locations, enabling cloud management without requiring complex networking or infrastructure configuration. However, other suitable cloud connection infrastructure may also be used in different embodiments.

Figure 7:
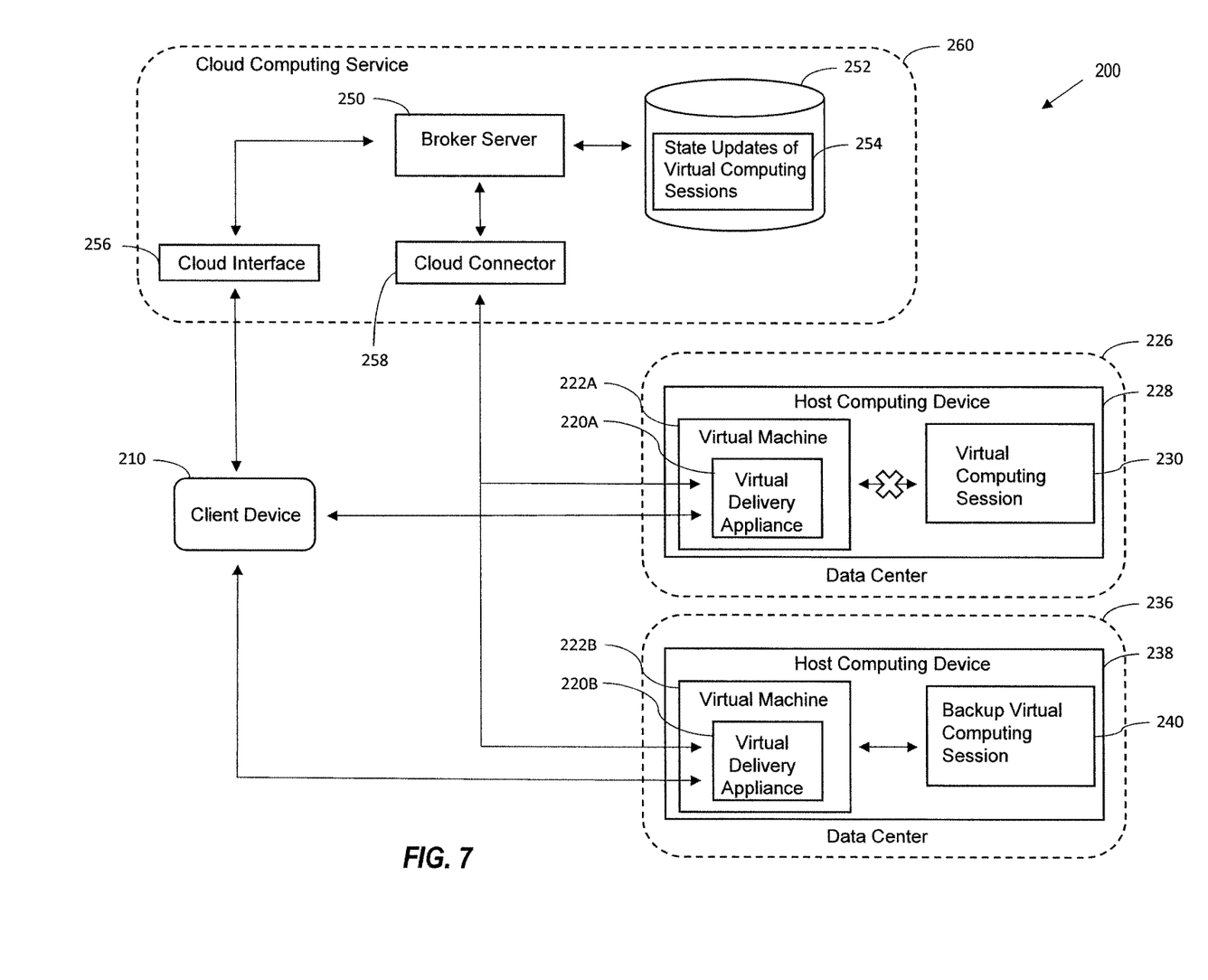
FIG. 7 is a more detailed schematic block diagram of the computer system illustrated in FIG. 6.

The illustrated computer system 200 will now be discussed in greater detail with reference to FIG. 7. A host computing device 228 providing the virtual computing session 230 is in a data center 226, and a host computing device 238 providing the backup virtual computing session 230 may be in a different data center 236. In other embodiments, the host computing devices 228, 238 may be in the same data center.

Host computing devices 228, 238 include a virtual machine 222A, 222B managed by a hypervisor, respectively. The virtual machine 222A provides the virtual computing session 230 and the virtual machine 222B provides the backup virtual computing session 230 within which applications execute on behalf of the client device 210. The virtual delivery appliance 220A is associated with virtual machine 222A, and the virtual delivery appliance 220B is associated with virtual machine 222B.

The status of the virtual computing session 230 correlates with a status of the virtual machine 222A. Status refers to an operating condition or operational capabilities at a particular point in time. The operating condition or operational capabilities of the virtual computing session 230 correlates with the operating condition or capabilities of the virtual machine 222A. When the virtual machine 222A is available, then the virtual computing session 230 likewise is available. This corresponds to a normal operating status at a particular time. When the virtual machine 222A is no longer available, then the virtual computing session 230 likewise is no longer available. This corresponds to a failed operating status at a particular time.

The virtual delivery appliance 220A provides status updates about the virtual machine 222A to the broker service 250. The status updates may be referred to as a heartbeat or health signal that allows the broker service 250 to determine if the virtual machine 222A providing the virtual computing session 230 has a normal operating status or a failed operating status. The heartbeat or health signal may be periodic pings from the virtual delivery appliance 220A to the broker service 250. The status updates thus let the broker service 250 know if the virtual machine 222A is providing the virtual computing session 230 to the client device 210.

The virtual delivery appliance 220A also periodically provides state updates 254 to the broker service 250 on applications running in the virtual computing session 230. A most recent state update 254 is to be used by the broker service 250 on the backup virtual session 240 when the virtual computing session 230 has a failed operating status.

One approach to synchronizing the backup virtual computing session 240 with the virtual computing session 230 is to do so after failure of the virtual computing session 230. In other words, the broker service 250 updates a state of the backup virtual computing session 240 for a first time after failure of the virtual computing session 230.

An advantage of this approach is to reduce the number of host computing devices 238 that are reserved or set aside for backup virtual computing sessions 240. For example, there may be tens of thousands of host computing devices 228 providing virtual computing sessions 230 in the data center 226, but only a small percentage may fail at any one time. Consequently, the number of host computing devices 238 needed for providing the backup virtual computing sessions 240 in the data center 238 is much lower. For example, 10 to 20 host computing devices 238 in the data center 236 may be set aside for providing backup virtual computing sessions 240. The broker server 250 still periodically stores state updates 254 of each virtual computing sessions 230 in a database 252.

Another approach to synchronizing the backup virtual computing session 240 with the virtual computing session 230 is to do a mapping (e.g., a one-to-one mapping) with the virtual computing session 230 while the virtual computing session 230 is available to the client device 210. This requires the number of host computing devices 238 providing the backup virtual computing sessions 240 to equal the number of host computing devices 228 providing the virtual computing sessions 240. For example, tens of thousands of host computing devices 238 in the data center 236 would be set aside for providing backup virtual computing sessions 240. Each time the broker service 250 receives a state update 254 of a virtual computing session 230, that state update 254 is provided to the corresponding backup virtual computing session 240.

As noted above, the host computing device 228 may be taken offline for maintenance without any warning resulting in the client device 210 momentarily losing the virtual computing session 230 until redirected to the backup virtual computing session 240. However, in other embodiments, warning may be provided from the virtual delivery appliance 220A to the broker service 250. This allows the broker service 250 to go ahead and redirect the client device 210 from the virtual computing session 230 to the backup virtual computing session 240 without having the virtual delivery appliance 220A reporting a failed operating status. Alternatively, the virtual delivery appliance 220A may delay shutdown of the virtual machine 222A providing the virtual computing session 230 to allow time for the client device 210 to be redirected to the backup virtual computing session 240 without having the virtual delivery appliance 220A reporting a failed operating status.

Figure 8:
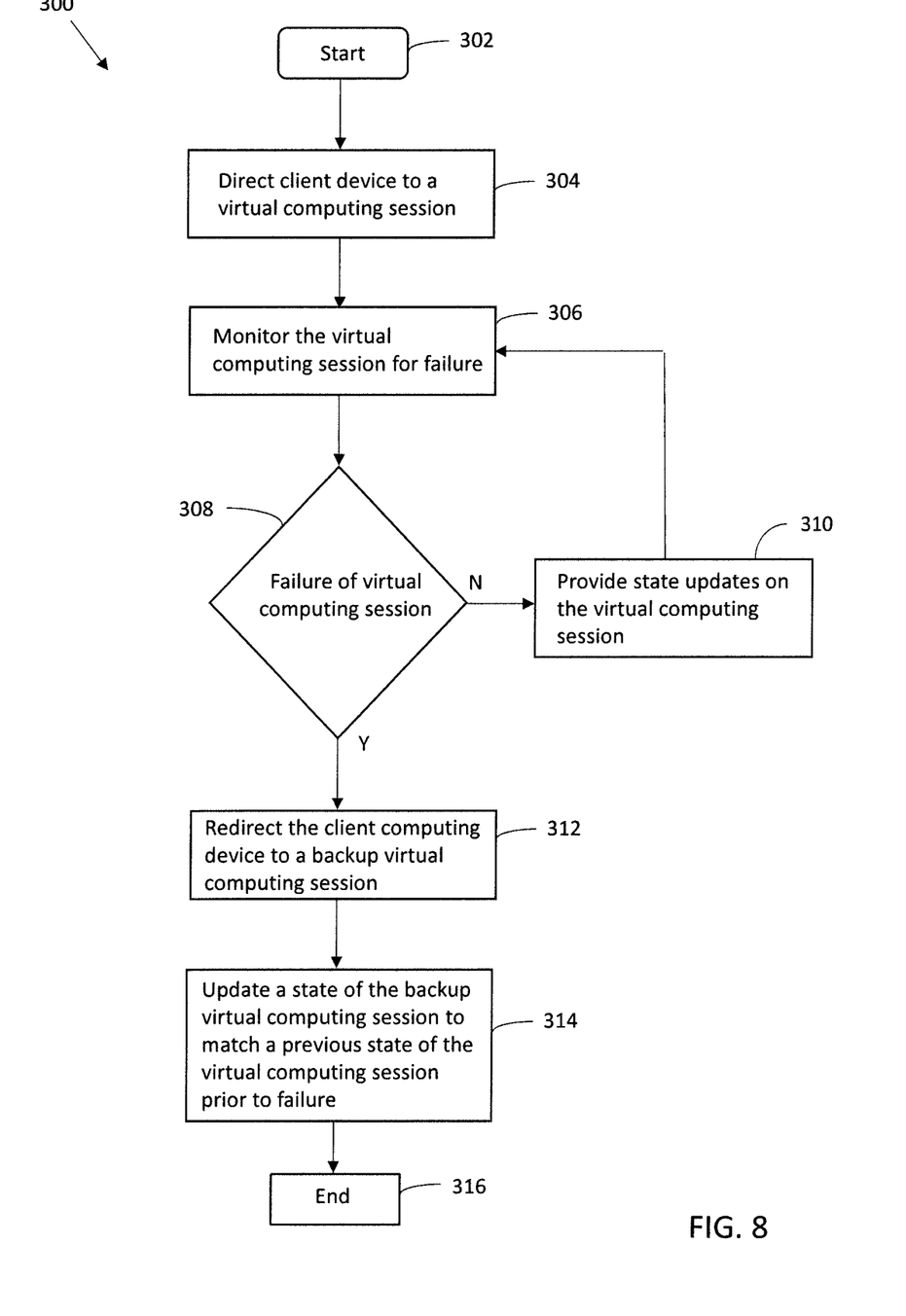
FIG. 8 is a flowchart illustrating a method for operating the computer system illustrated in FIG. 6.

Referring now to FIG. 8, a flowchart 300 illustrating a method for operating the computer system 200 will be discussed. From the start (Block 302), the method includes connecting a client device 210 to a virtual computing session 230 at Block 304. The broker service 250 monitors a status of the virtual computing session 230 at Block 306, as previously described above. The broker service 250 determines at Block 308 if there is a failure of the virtual computing session 230, as also previously described above. If the client device 210 is still accessing the virtual computing session 230, then the virtual delivery appliance 220A provides periodic state updates on the virtual computing session 230 at Block 310. If the client device 210 is no longer able to access the virtual computing session 230, then the broker service 250 redirects the client device 210 to a backup virtual computing session 240 based on a failure of the virtual computing session at Block 312, and updates a state of the backup virtual computing session 240 to match a previous state of the virtual computing session 230 prior to failure at Block 314. The method ends at Block 316.

Figure 9:
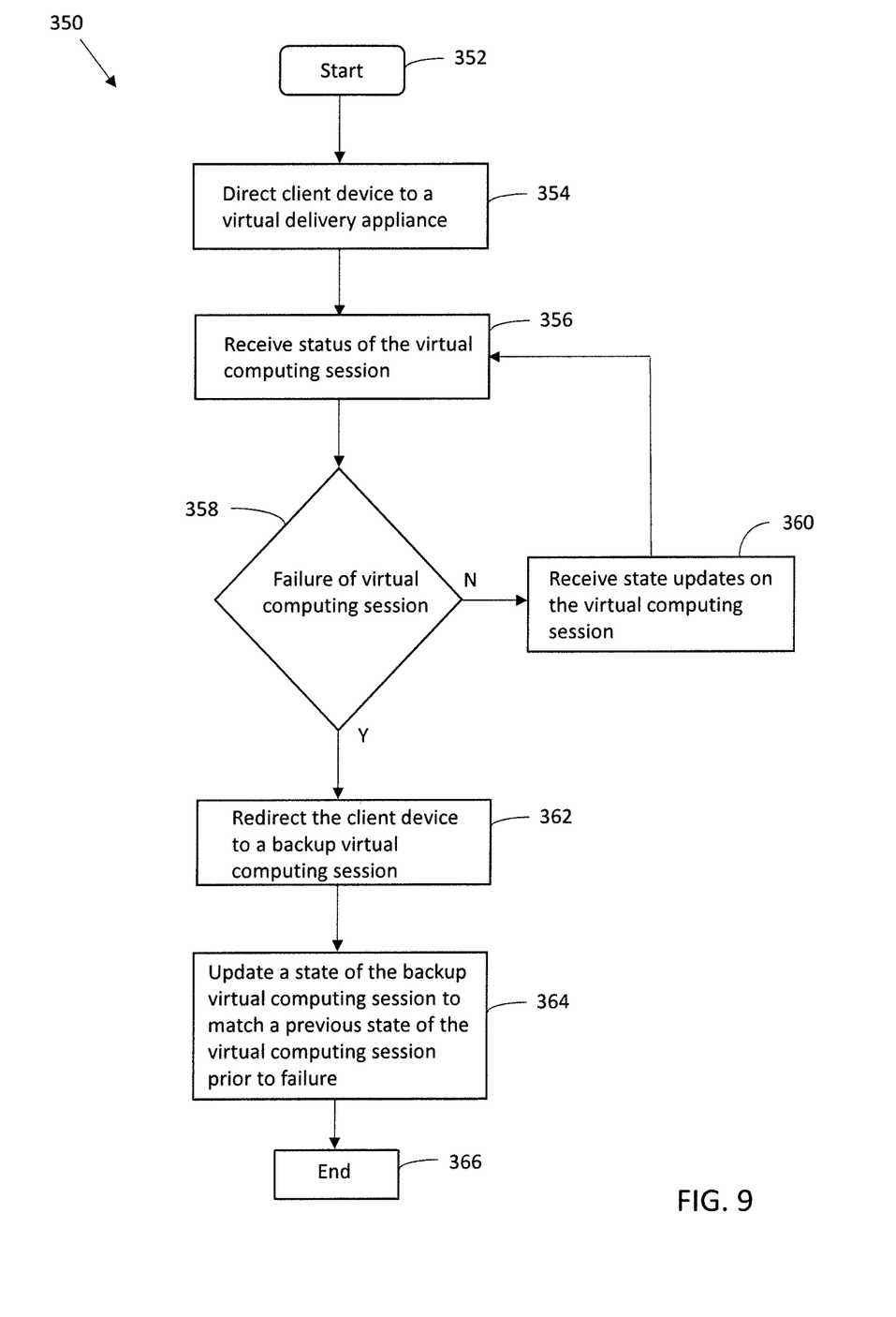
FIG. 9 is a flowchart illustrating a method for operating the broker service illustrated in FIG. 6.

Referring now to FIG. 9, a flowchart 350 illustrating a method for operating the broker service 250 within the computer system 200 will be discussed. From the start (Block 352), the method includes directing or assigning a client device 210 to a virtual delivery appliance 220A at Block 354. The broker service 250 receives a status of the virtual computing session 230 at Block 356. The broker service 250 monitors a status of the virtual computing session 230 at Block 358 to determine if there is a failure of the virtual computing session 230, as previously described above. If the client device 210 is still accessing the virtual computing session 230, then the virtual delivery appliance 220A provides periodic state updates on the virtual computing session 230 at Block 360. If the client device 210 is no longer able to access the virtual computing session 230, then the broker service 250 redirects the client device 210 to a backup virtual computing session 240 based on a failure of the virtual computing session at Block 362, and updates a state of the backup virtual computing session 240 to match a previous state of the virtual computing session 230 prior to failure at Block 364. The method ends at Block 366.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed:

1. A computer system comprising:
a client device; and
a hardware server comprising at least one virtual delivery appliance and configured to monitor a virtual computing session for failure, with the virtual computing session being accessed by said client device via said at least one virtual delivery appliance, receive state updates of the virtual computing session being monitored from said at least one virtual delivery appliance, redirect said client device to a backup virtual computing session based on failure of the virtual computing session, and update a state of the backup virtual computing session based on the received state updates to match a previous state of the virtual computing session prior to failure.

2. The computer system according to claim 1 wherein said server updates the state of the backup virtual computing session with a most recent state update received.

3. The computer system according to claim 1 wherein said server updates the state of the backup virtual computing session before failure of the virtual computing session.

4. The computer system according to claim 1 wherein said server updates the state of the backup virtual computing session after failure of the virtual computing session.

5. The computer system according to claim 1 wherein said at least one virtual delivery appliance comprises a plurality of virtual delivery appliances, and wherein said server redirects said client device to a different virtual delivery appliance to access the backup virtual computing session.

6. The computer system according to claim 5 wherein the virtual computing session is hosted in a data center, and wherein the backup virtual computing session is hosted in a different data center.

7. The computer system according to claim 1 wherein said at least one virtual delivery appliance monitors a status of the virtual computing session, and provides the status to said server.

8. A server comprising:
a memory and a processor cooperating with said memory and configured to
interface with at least one virtual delivery appliance connecting a client device to a virtual computing session,
monitor the virtual computing session for failure,
receive state updates of the virtual computing session being monitored from the at least one virtual delivery appliance,
redirect the client device to a backup virtual computing session based on failure of the virtual computing session, and
update a state of the backup virtual computing session based on the received state updates to match a previous state of the virtual computing session prior to failure.

9. The server according to claim 8 wherein said processor updates the state of the backup virtual computing session with a most recent state update received.

10. The server according to claim 8 wherein said processor updates the state of the backup virtual computing session before failure of the virtual computing session.

11. The server according to claim 8 wherein said processor updates the state of the backup virtual computing session after failure of the virtual computing session.

12. The server according to claim 8 wherein the at least one virtual delivery appliance comprises a plurality of virtual delivery appliances, and wherein said processor redirects the client device to a different virtual delivery appliance to access the backup virtual computing session.

13. The server according to claim 12 wherein the virtual computing session is hosted in a data center, and wherein the backup virtual computing session is hosted in a different data center.

14. A method comprising:
interfacing with at least one virtual delivery appliance connecting a client device to a virtual computing session;
monitor the virtual computing session for failure;
receiving state updates of the virtual computing session being monitored from the at least one virtual delivery appliance,
redirecting the client device to a backup virtual computing session based on failure of the virtual computing session; and
updating a state of the backup virtual computing session based on the received state updates to match a previous state of the virtual computing session prior to failure.

15. The method according to claim 14 wherein the state of the backup virtual computing session is updated before failure of the virtual computing session.

16. The method according to claim 14 wherein the state of the backup virtual computing session is updated after failure of the virtual computing session.

17. The method according to claim 14 wherein the at least one virtual delivery appliance comprises a plurality of virtual delivery appliances, and wherein the client device is redirected to a different virtual delivery appliance to access the backup virtual computing session.

* * * * *